No. 892,165. PATENTED JUNE 30, 1908.
C. KÖNCKOW & A. KRÜGER.
JOINT FOR DETACHABLY CONNECTING TO ONE ANOTHER THE PARTS
OF WOODEN FURNITURE AND THE LIKE.
APPLICATION FILED DEC. 13, 1907.
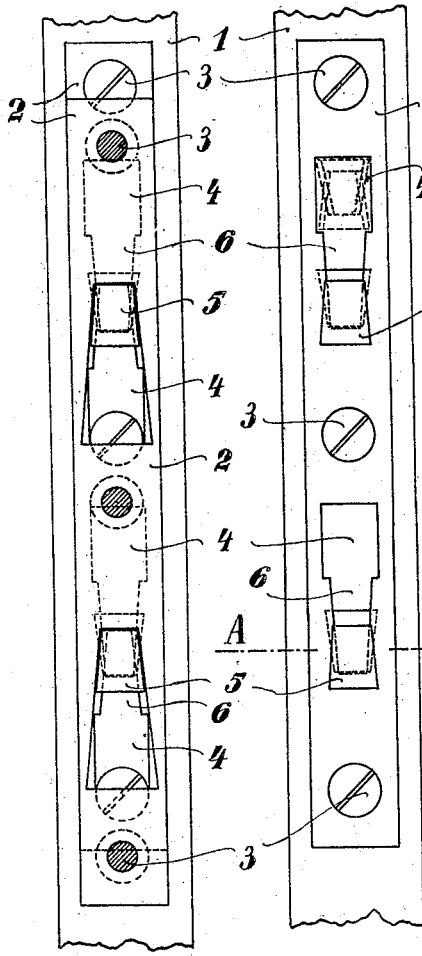
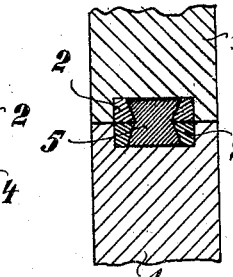
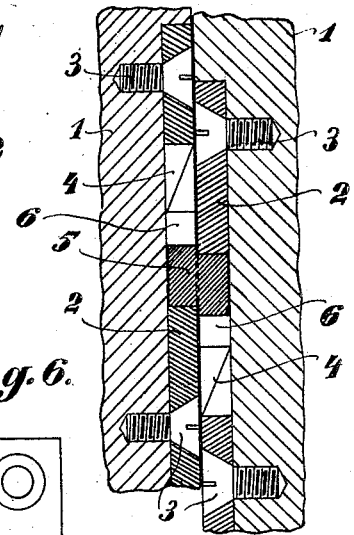
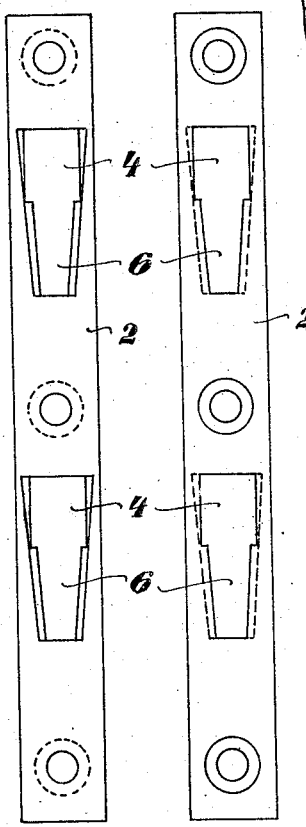
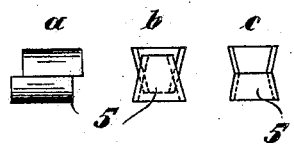
WITNESSES:
INVENTORS:
CARL KÖNCKOW AND
AUGUST KRÜGER.
BY
ATTORNEYS.

UNITED STATES PATENT OFFICE.

CARL KÖNCKOW AND AUGUST KRÜGER, OF KÖSLIN, GERMANY.

JOINT FOR DETACHABLY CONNECTING TO ONE ANOTHER THE PARTS OF WOODEN FURNITURE AND THE LIKE.

No. 892,165.　　　　　Specification of Letters Patent.　　　Patented June 30, 1908.

Application filed December 13, 1907. Serial No. 406,318.

*To all whom it may concern:*

Be it known that we, CARL KÖNCKOW and AUGUST KRÜGER, subjects of the King of Prussia, German Emperor, and both residing at Köslin, in the Province of Pomerania, Kingdom of Prussia, German Empire, have invented new and useful improvements in joints for detachably connecting to one another the parts of wooden furniture and the like, such as the sides and ends of wooden bedsteads, of which the following is a specification.

This invention relates to joints for detachably connecting to one another the parts of wooden furniture and the like, such as the ends and sides of wooden bedsteads and consists in forming such joints of suitably recessed plates, which are adapted to be connected to one another by the insertion of two wedge shaped intermediate pieces.

This invention differs considerably from known devices designed for the purpose. Firstly the plates to be used and screwed to the parts of frames to be connected to one another, are quite smooth so that no deep recesses are required in the wooden parts. Further the plates and the intermediate connecting pieces are formed exactly similar to one another so that each intermediate piece fits into every recess in the plates and finally the two halves of each intermediate piece are made exactly uniform.

The advantages of the joints are that the plates are smooth without hooks or projections which may easily break off and thus render the joint useless, thus joints constructed according to this invention are extremely durable. The breaking off of the intermediate pieces used is quite obviated, even under rough treatment.

The intermediate pieces are constructed quite uniformly, both as regards one to the other and the half of one piece to the other half, and therefore they can be inserted into every hole of the plates without regard to the position of their halves to the parts to be joined.

As in known arrangements with loose intermediate pieces the engaging parts are not wedge shaped in two directions but only in one direction, or are even formed essentially prismatic, the present invention has the further advantage that the parts are fixed quite automatically under the action of the weight, further in the present construction the connecting and disconnecting of the parts is effected very easily and conveniently. And in order that this invention may be the better understood, we now proceed to describe the same with reference to the accompanying drawings and to the letters and figures marked thereon.

Like letters refer to like parts in the various figures.

Figure 1 shows in elevation the two pieces of the joint ready mounted. Fig. 2 is a corresponding view with the upper plate removed. Fig. 3 shows a transverse section on the line A—B of Fig. 1. Fig. 4 shows a longitudinal section through Fig. 1. Figs. 5 and 6 are elevations of the plates from different sides. Fig. 7 shows three different projections of the connecting piece.

Plates 2 are screwed by screws 3 to wooden parts 1, to be connected to one another, see Fig. 4. It is preferred to let the plates into corresponding recesses in the wooden parts. The plates have recesses 4 one in the upper part and one in the lower part. These recesses are sufficiently large enough so that the connecting pieces 5 can be inserted, and they are extended into wedge shaped slots 6. The latter are doubly wedge shaped, the side faces of the slots converging towards one end of the slot as well as towards the front face of the plate. The form of the connecting pieces corresponds with the before mentioned construction of the slots, Figs. 3 and 7. These pieces 5 consist each of two wedge shaped halves formed in one piece, which are also wedge shaped in two directions as the slots in the plates 2, *i. e.* towards one end and towards one side surface; the two halves join on the smaller sides so that the narrower wedge end is situated opposite to the broader one, and the halves may be somewhat transposed to each other in longitudinal direction. A cross section through an intermediate piece at right angles to its longitudinal axis has the form of two dovetails joining at their narrow ends. These connecting pieces 5 are placed through the slots 4 of one of the plates with due regard to the inclination of the wedge faces, and then are drawn firmly into the wedge shaped slot 6. The plate screwed to the other wooden part is then caused to engage with the first plate so that at first the projecting half of the connecting piece is placed into the recess 4. When now the wooden part is lowered, the projecting part of the connecting piece 5 passes into the wedge shaped slot 6 so that the parts are clamped together automatically.

The joining of the parts to be connected is greatly facilitated by the plates used being quite smooth without projections. The joint has the further advantage that any rocking or rattling of the parts connected to one another is quite obviated. The separate parts of the joint can be made very cheaply.

We claim:

1. A joint for detachably connecting parts of wood to one another consisting of smooth plates and loose connecting pieces, the former being screwed to the parts to be connected and provided with wedge shaped recesses one like the other partly rear-cut, and the latter being of double dovetail section, the two halves of which are wedge shaped in two directions and join each other by the narrower parts in such a manner that a broad wedge end is opposite to a narrow one, substantially as described.

2. A joint for detachably connecting parts of wood to one another, comprising a pair of plates each having flat or plane front and rear faces and elongated, under-cut, wedge-shaped recesses, and connecting pieces each having two similar, oppositely-directed, wedge-shaped halves adapted to be inserted in the recesses of said plates.

3. A joint of the class described comprising a pair of identical plates having wedge-shaped, under-cut recesses, and connecting pieces each having two wedge-shaped halves respectively adapted to coöperate with the recesses of said plates.

CARL KÖNCKOW.
AUGUST KRÜGER.

Witnesses:
KURT SONNEMANN,
EMIL KÖTTERITZSCH.